(12) United States Patent
Crasta et al.

(10) Patent No.: US 9,866,491 B2
(45) Date of Patent: Jan. 9, 2018

(54) METHOD AND SYSTEM FOR AVOIDING NEW FLOW PACKET FLOOD FROM DATA PLANE TO CONTROL PLANE OF A NETWORK DEVICE

(71) Applicants: Denis A. Crasta, San Jose, CA (US); Srinivasa R. Addepalli, San Jose, CA (US); Rekesh John, Livermore, CA (US)

(72) Inventors: Denis A. Crasta, San Jose, CA (US); Srinivasa R. Addepalli, San Jose, CA (US); Rekesh John, Livermore, CA (US)

(73) Assignee: NXP USA, Inc., Austin, TX (US)

( * ) Notice: Subject to any disclaimer, the term of this patent is extended or adjusted under 35 U.S.C. 154(b) by 371 days.

(21) Appl. No.: 14/135,792

(22) Filed: Dec. 20, 2013

(65) Prior Publication Data
US 2015/0180783 A1 Jun. 25, 2015

(51) Int. Cl.
*H04L 12/851* (2013.01)

(52) U.S. Cl.
CPC ...... *H04L 47/2441* (2013.01); *H04L 47/2483* (2013.01)

(58) Field of Classification Search
CPC . H04L 47/2441; H04L 47/2483; H04L 45/38; H04L 12/56
See application file for complete search history.

(56) References Cited

U.S. PATENT DOCUMENTS

| 7,529,186 | B2 | 5/2009 | Smethurst et al. | |
|---|---|---|---|---|
| 8,949,467 | B1* | 2/2015 | Flanagan | H04L 69/04 709/247 |
| 2002/0138618 | A1* | 9/2002 | Szabo | H04L 12/26 709/225 |
| 2005/0021842 | A1 | 1/2005 | Narayanan et al. | |
| 2006/0203768 | A1* | 9/2006 | Stolyar | H04L 47/10 370/329 |
| 2007/0127491 | A1 | 6/2007 | Verzijp et al. | |
| 2008/0019368 | A1* | 1/2008 | Liu | H04L 12/4641 370/392 |

(Continued)

OTHER PUBLICATIONS

Aida, M. et al., "Control Plane Stability with Retrial Traffic and Comparison of Hard- and Soft-State Protocols", Global Telecommunications Conference, 2007, pp. 2729-2734.

*Primary Examiner* — Noel Beharry
*Assistant Examiner* — Ruihua Zhang (57) ABSTRACT

A mechanism is provided by which communication is reduced between a data plane of a network device and a control plane associated with that network device upon introduction of a new flow. A holding table is provided for every active flow table in the data plane. The holding table holds flow contexts for new flows not found in the associated active flow table, while awaiting flow information from the control plane. Each flow context includes a queue of subsequent data packets associated with the flow, which are held from the control plane pending receipt of the flow information from the control plane. A timeout mechanism compensates for packet loss between the network device and control plane. When the data plane receives the flow information from the control plane, the data plane then processes all the queued packets, deletes the flow context, and enters the data into an associated flow table.

19 Claims, 8 Drawing Sheets

(56) References Cited

U.S. PATENT DOCUMENTS

| | | | | |
|---|---|---|---|---|
| 2013/0223455 A1* | 8/2013 | Kuroki | .................... | H04L 47/82 370/445 |
| 2013/0230047 A1* | 9/2013 | Subrahmaniam | ... | H04L 47/2441 370/392 |
| 2014/0269319 A1* | 9/2014 | DeCusatis | ............... | H04L 47/12 370/236 |
| 2014/0269379 A1* | 9/2014 | Holbrook | ............ | H04L 43/0882 370/252 |

* cited by examiner

METHOD AND SYSTEM FOR AVOIDING NEW FLOW PACKET FLOOD FROM DATA PLANE TO CONTROL PLANE OF A NETWORK DEVICE

BACKGROUND

Field

This disclosure relates generally to network devices such as switches and routers, and more specifically, to avoiding flooding of packets from a data plane to a control plane of a network device.

Related Art

Network devices such as switches and routers form the backbone of modern data networks. Data packets arrive at such network devices and are forwarded to their destinations using information found in the data packet. A switch generally forwards a data packet using the destination media access control (MAC) address found in the packet. A router generally forwards a data packet using the destination internet protocol (IP) address found in the packet. For example, typical actions of a switch provide for a data frame being received by switch at an input port, a MAC address table being checked for the source and destination, the MAC address table being updated if necessary (e.g., the MAC address table not having one of the MAC addresses), and forwarding the data frame from an output port.

In order to provide more flexibility in network data forwarding decision making, including ease of including additional protocols beyond MAC and IP addressing, programmable networks have been introduced. Programmable networks utilize flow forwarding, rather than switch paths or the like. Data flows of a stream of packets are associated with flow tables, which define the routes data packets follow and the processing those data packets receive. Flows are defined, in part, by a control plane that can be implemented on a device separate from the network switch or router, and data packets are received and transmitted by a data plane that is incorporated in the network switch or router.

The data plane and the control plane processors communicate with one another, for example, when a data packet associated with a previously unknown flow (to the data plane) arrives at the network device. The data plane then sends the data packet, or information associated with the data packet, to the control plane for processing. The control plane determines the parameters for the flow associated with the packet, and provides that back to the data plane for entry into flow tables and processing of flow packets. During the period from which the data packet information is provided to the control plane until the routing information is received by the data plane and entered into the flow tables, all packets which are associated with the unknown flow are not processed. Instead, each new packet of that flow may be provided to the control plane, thereby overloading the communication network between the data plane and the control plane, and also potentially loading down the control plane processes. It is therefore desirable to provide a mechanism to reduce this communication between the data plane and the control plane, in order to decrease the load on the communication channel and on the control plane processes.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The figures are not necessarily drawn to scale.

DETAILED DESCRIPTION

Embodiments of the present invention provide a mechanism by which communication is reduced between a data plane of a network device and a control plane associated with that network device when a new flow is introduced to the data plane. Embodiments provide a holding table for every active flow table in the data plane. The holding table is configured to hold flow contexts for new flows not found in the associated active flow table, while awaiting flow information from the control plane. Each flow context includes a queue of subsequent data packets associated with the flow, which are held from the control plane pending receipt of the flow information from the control plane. When the data plane receives the flow information from the control plane, the data plane then processes all the queued packets, deletes the flow context, and that flow information is entered into an associated flow table. By use of embodiments of the present invention, additional processing and communication overhead involved in sending the packets to the control plane, detection of duplicate flow, and returning the packets to the data plane for processing are eliminated.

Embodiments also provide a timeout mechanism to improve network device service quality. The timeout mechanism provides protection for new flow packet loss occurring either in the network device or control network coupling the network device with the control plane. This can occur during overload situations where high new flow creation is occurring. End hosts handle the lost packets in a manner specific to the communication protocol. Upon expiration of the timer, the network device sends a next available packet for a new flow to the control plane.

Network devices, such as switches, provide a data plane for receiving data packets on the data network. The data plane includes tables that are used to look up information contained in a received data packet and to determine how to process and forward the data packet to a destination or intermediate address. In the event the information contained in the received data packet is not found in the tables, then the data plane communicates with a control plane for information on how to process the packet. The control plane receives the data packet information and performs tasks necessary to determining how the received data packet should be processed. The control plane then provides flow information back to the data plane, which stores that flow information in flow tables accessible to the data plane. The packets associated with the flow are then processed in accord with the flow information.

Traditionally, control plane and data plane processors are implemented in a closed system, which uses a tightly coupled low latency connection to facilitate quick synchronization of state from the control plane to the data plane. Flow offloading between the data plane and the control plane, with a response being provided back, usually occurs quickly, and before a second packet of the flow arrives at the data plane. If a few packets from the data flow arrive before receipt of the flow information from the control plane, the data plane sends those subsequent packets to the control plane. The control plane will then determine whether those packets belong to the same flow as the previously received packet, and will take appropriate action (e.g., not process the subsequent packet(s) or will send the subsequent packet(s) back to the data plane), so as not to create a duplicate flow.

Current flow-based network devices depart from tightly coupling the data plane and control plane, and are instead putting the control plane and data plane in separate devices that communicate over a network. The separate control plane can be located in a controller that handles control actions for multiple network devices on the network, thereby enabling, for example, software defined networking applications. This separation of the control plane from the data plane, however, can increase communication latency between the control plane and the data plane. The increased communication latency has an effect of increasing the number of new flow packets that data plane processors are sending to the control plane, which can overburden the communication channel, as well as the control plane. This can result in lower performance of the overall network, and flow setup rate can be adversely affected.

Embodiments of the present invention seek to conserve the channel bandwidth of the control plane-data plane communication channel, as well as control plane processing resources. This is done by providing a queuing mechanism for subsequent packets in a flow at the data plane, rather than sending them to the control plane. Only if a timer associated with the flow expires would a packet subsequent to an initial packet in the flow be sent to the control plane from the data plane. Once the control plane offloads the flow information to the data plane, all the queued packets will be processed in accord with that flow information.

Figures 1, 1A:
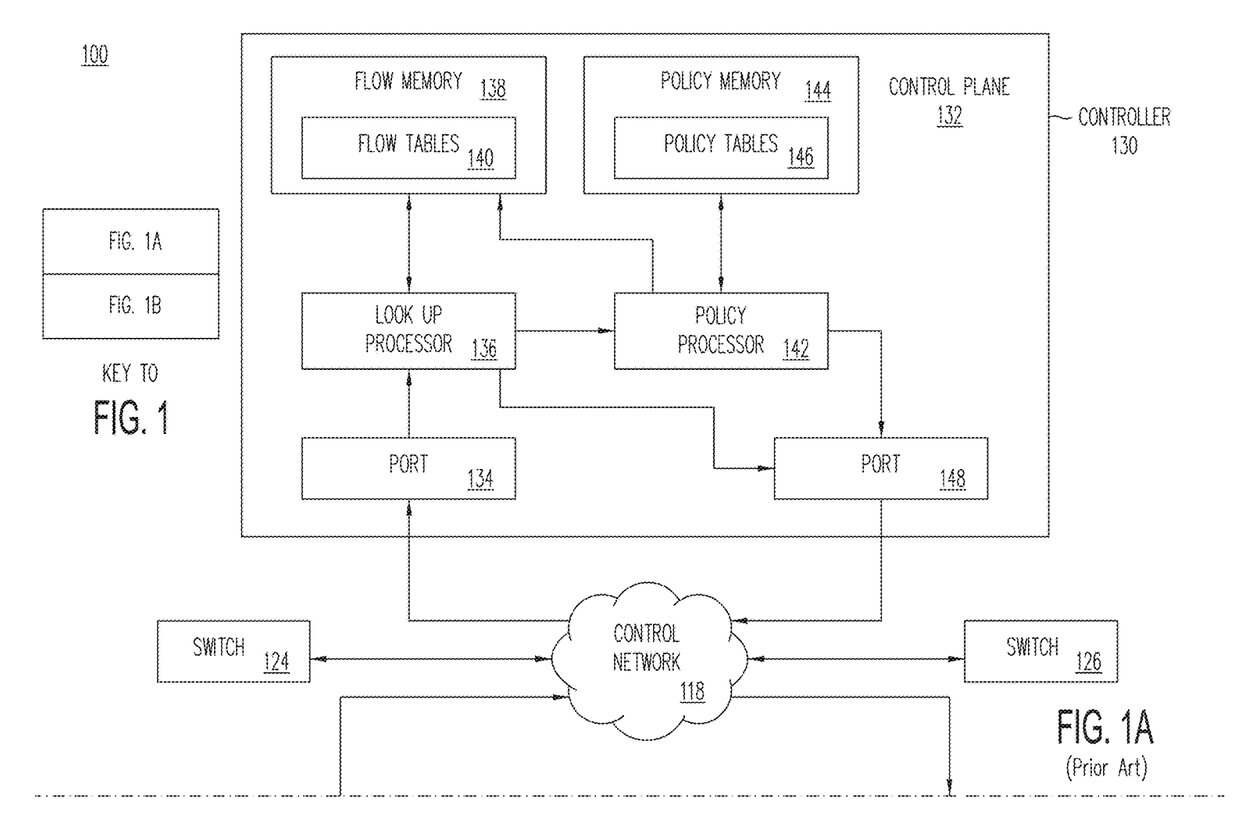
FIG. 1 is a simplified flow diagram illustrating a data plane/control plane system, in accord with certain prior art devices. The content of FIG. 1 is divided between FIGS. 1A and 1B.
Figure 1B:
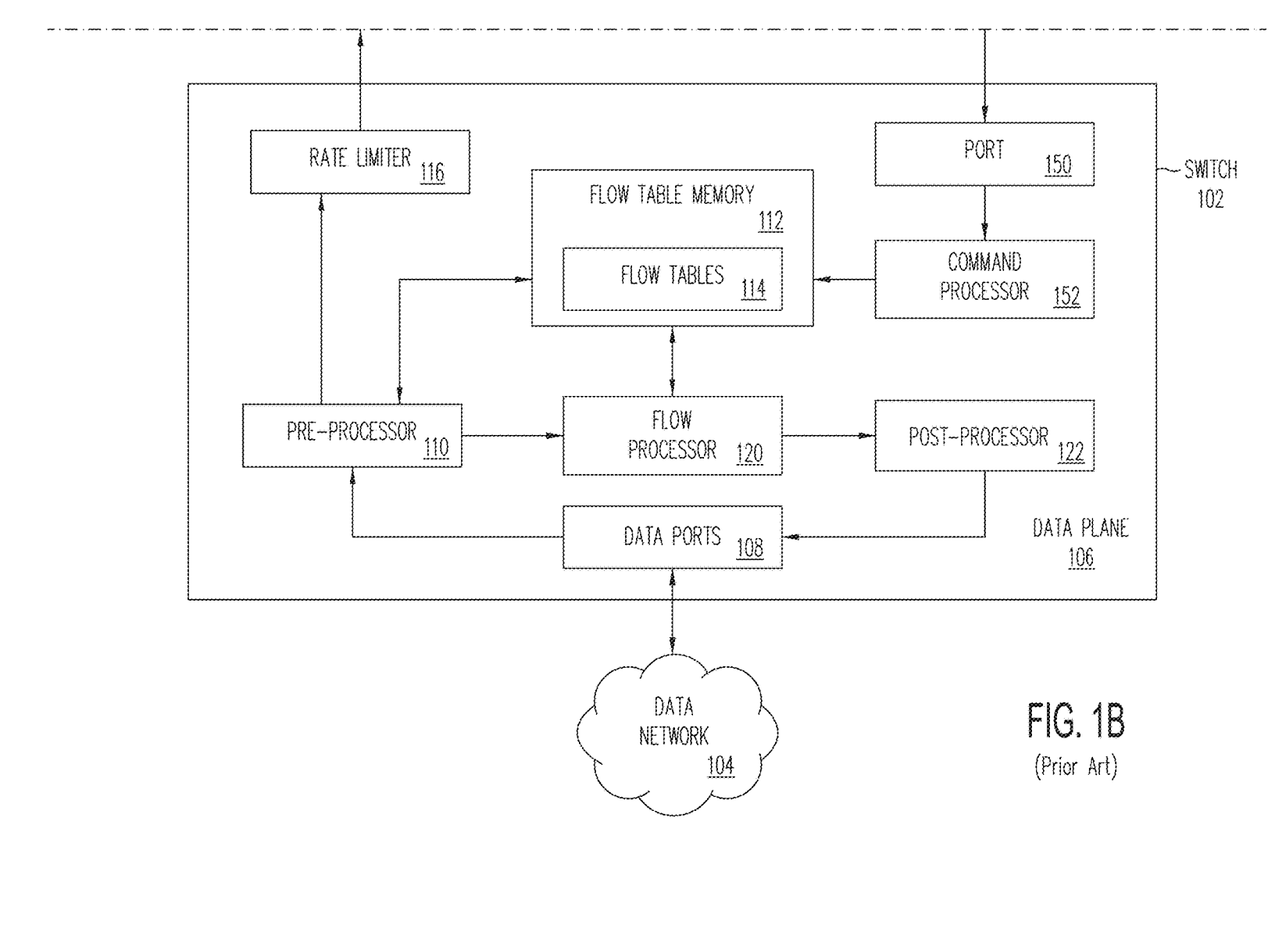

FIG. 1 is a simplified flow diagram illustrating a data plane/control plane system 100, in accord with certain prior art devices. A switch 102 is coupled to a data network 104. Switch 102 locally contains a data plane 106 for processing data packets arriving from data network 104. Data packets are received at data ports 108. The data packets are provided from the data ports to a pre-processor 110. Pre-processor 110 performs preliminary tasks on the information found in a data packet, including, for example, flow lookup.

Pre-processor 110 can examine the data packet and extract information that serves to identify the associated flow (e.g., destination, data type, and the like). The pre-processor can then use that information to perform a lookup on flow tables 114 stored in flow table memory 112. Flow table memory is typically a ternary content-addressable memory (TCAM) that can run at data line-rate. The flow tables include entries associated with flows or a stage of a flow. Information in a flow table entry can include identifier fields such as, for example, VLAN ID, Ethernet source and destination addresses, IP source and destination addresses, TCP source and destination, and the like.

Each flow table entry also provides an action to be performed on a packet of an associated flow. Basic flow table entries include actions such as: forwarding the flow's packets to a given port or ports (e.g., data ports 108), thereby allowing packets to be routed through data network 104; encapsulating the packet and forwarding the flow's packets to a controller (e.g., controller 130), delivering the packet to a secure channel between switch 102 and controller 130, which is typically done for the first packet in a new flow, as will be discussed in more detail below; dropping the flow's packets (e.g., for security reasons); and, forwarding the flow's packets through the switch's normal processing pipeline (e.g., flow processor 120) to define VLANs and the like.

If pre-processor 110 determines that the data packet has a corresponding flow table entry associated with the information in the packet, then the data packet can be provided to flow processor 120 for processing through the flow table entries. A typical flow for a data packet can be defined by one or more flow tables 114 stored in flow table memory 112. Flow processor 120 can be one processor or multiple processors configured as a pipeline, which can access the various flow tables as needed. Data packet header information can be modified by flow processor 120 during the processing. Once flow processing is completed, the modified data packet can be provided to post-processor 122 for preparation to transmit via data ports 108.

Should pre-processor 110 not find an associated flow in flow tables 114 for the received packet, then the packet is sent to controller 130 via a rate limiter 116 communicatively coupled to the secure control network 118. Rate limiter 116 is configured to limit the number of packets being transmitted on control network 118. The rate limiter does not track duplication of packets from a same flow. Thus, in a heavy traffic network, a most noisy flow (e.g., a flow with a large quantity of packets arriving prior to receiving instructions at the data plane from the control plane) may dominate control network traffic while a less noisy flow will lose to the most noisy flow, thereby causing poor service quality. Since controller 130 is separated from switch 102, the controller can be used to provide control plane services for other switches coupled to control network 118 (e.g., switch 124 and 126).

The data packet will arrive at a port 134 of controller 130 after passing through control network 118. A lookup processor 136 will perform a flow lookup from controller flow tables 140 stored in controller flow memory 138. Controller flow memory 138 can take the form of, for example, random access memory or content-addressable memory. If a flow is found for the packet, entries related to the flow from the flow tables are offloaded to switch 102 via a port 148 coupled to control network 118. If a flow is not found for the packet, then the packet information is provided to policy processor 142. Policy processor 142 interprets the type of information found in the data packet and uses information stored in policy tables 146 of policy memory 144 to generate one or more flow table entries for the flow. Policies found in the policy tables are configured by network administration, and provide actions to be taken for a variety of protocols, network configurations (e.g., VLANs), and the like. Once one or more flow table entries are configured by policy processor 142, the entries are stored in flow memory 138, and provided to switch 102 via the control network through port 148. It should be noted that although separate incoming and outgoing ports 134 and 148 are illustrated, embodiments can utilize a single or plural bi-directional ports to perform communications between controller 130 and nodes on control network 118.

Once the flow table entries for a flow are offloaded to switch 102, via port 150 coupled to control network 118, a command processor 152 processes the commands and stores them in the appropriate flow tables 114. At this point, the data packets associated with the flow can be processed by flow processor 120 in accord with the flow table entries, as discussed above. Again, it should be noted that although separate incoming and outgoing ports 116 and 150 are illustrated, embodiments can utilize a single or plural bi-directional ports to perform communications between switch 102 and controller 130 on control network 118.

Figure 2:
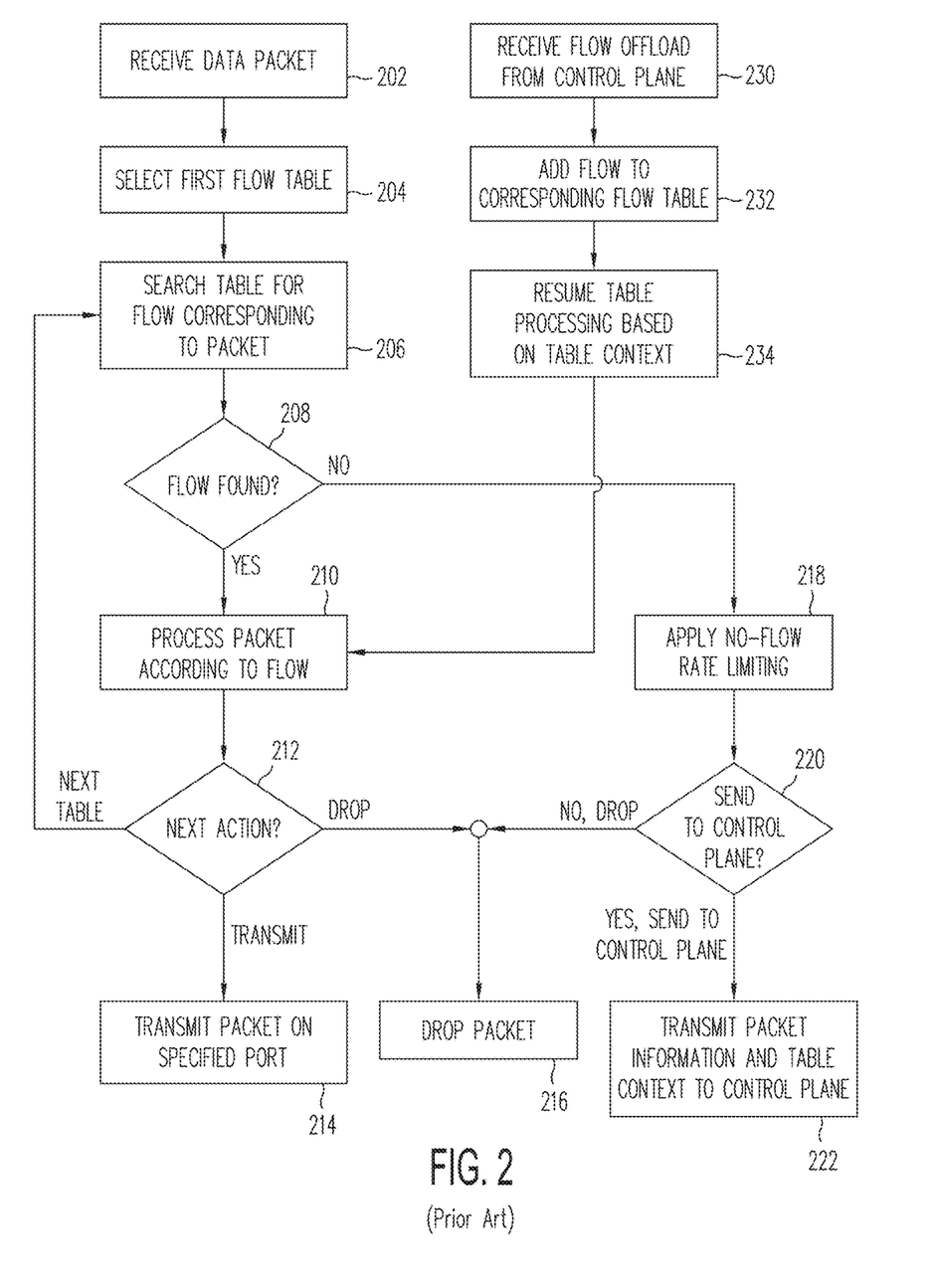
FIG. 2 is a simplified flow diagram illustrating a data plane operation flow of a prior art switch.

FIG. 2 is a simplified flow diagram illustrating a data plane operation flow of prior art switch 102, discussed above. A data packet associated with a flow is received (202) and then lookups are performed in the flow tables. A first flow table is selected (204) and the table is searched for flow entries corresponding to the information contained in the packet (206). If a flow entry is found corresponding to the information in the packet (208), then the data packet is processed according to that flow entry (210) (e.g., by flow processor 120). A determination is made whether there is a next action associated with the flow (212). Such actions can include dropping the packet (216), transmitting the packet on a specified port (214), or continuing processing of the data packet in accord with an entry in a next table, as defined in the current flow table entry (206).

If no flow entry is found (208), then the packet is sent to the control plane using a rate limiting mechanism that is not per-flow sensitive (218). A determination is made by the rate limiter as to whether to transmit the data packet (220). The packet can be transmitted to the control plane along with table context (e.g., table identifier) (222), or the packet can be dropped by the rate limiter (216).

As discussed above, in response to receiving the data packet, the control plane can determine the appropriate flow for the data packet, either from a pre-existing flow entry at the control plane, or by constructing a flow entry using policies. The data plane at the switch can then receive the flow offload from the control plane (230). The flow can be added to a corresponding set of flow tables (232), and table processing of the data packets associated with the flow can be resumed (234).

Figures 3, 3A:
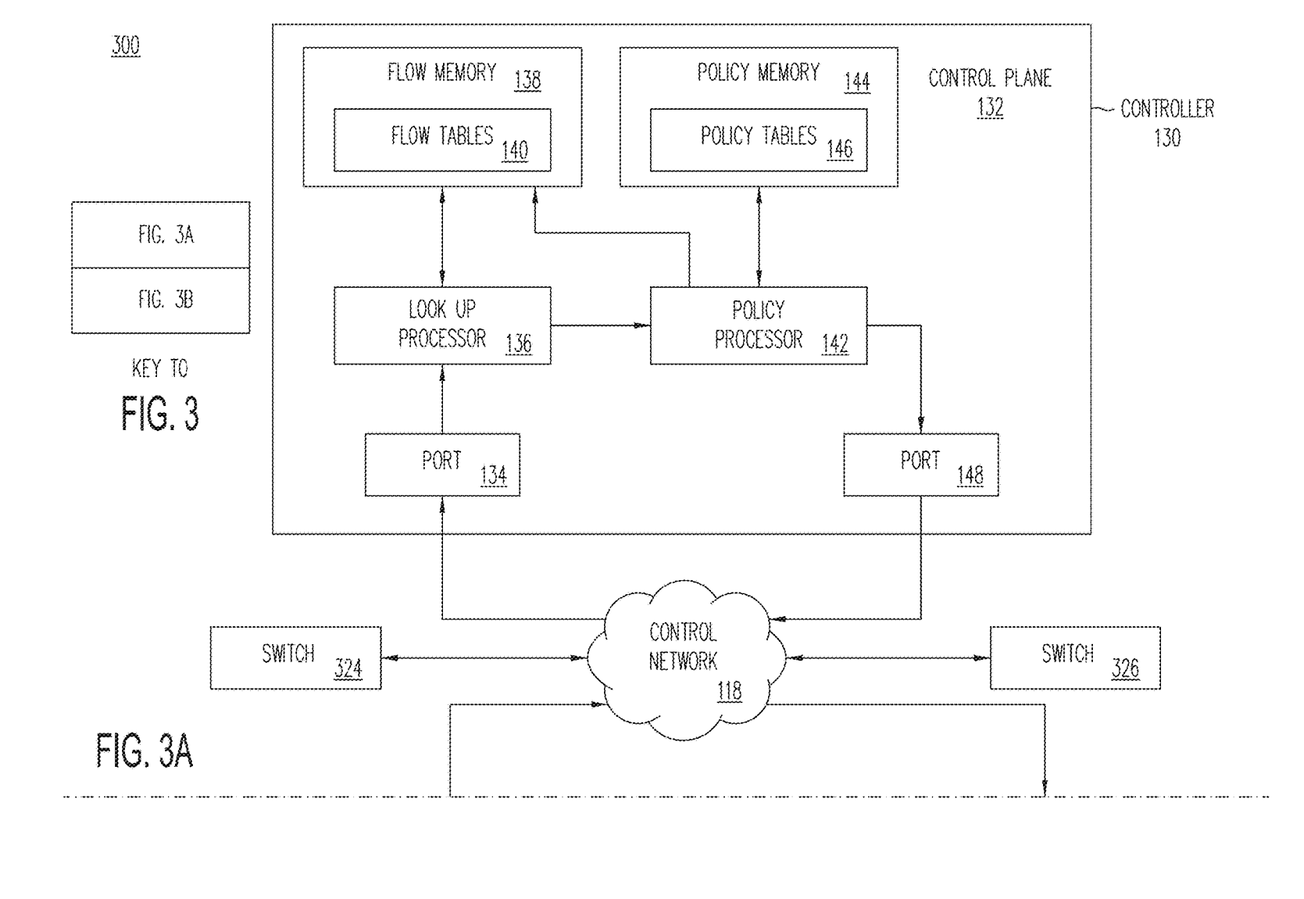
FIG. 3 is a simplified flow diagram illustrating a data plane/control plane system, in accord with embodiments of the present invention. The content of FIG. 3 is divided between FIGS. 3A and 3B.
Figure 3B:
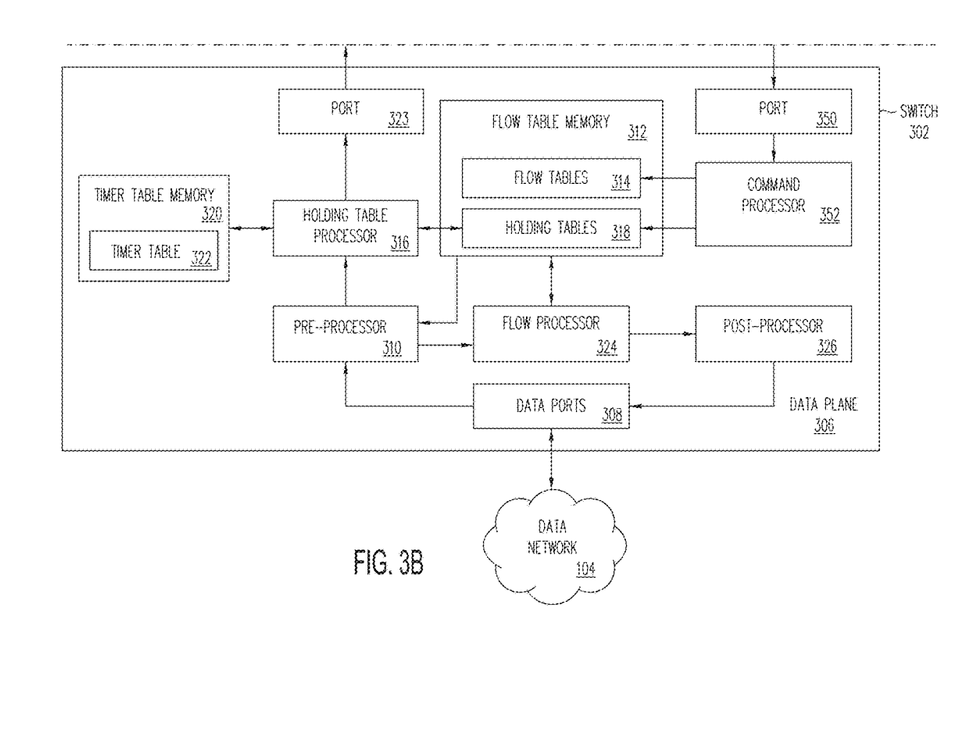
Figure 4:
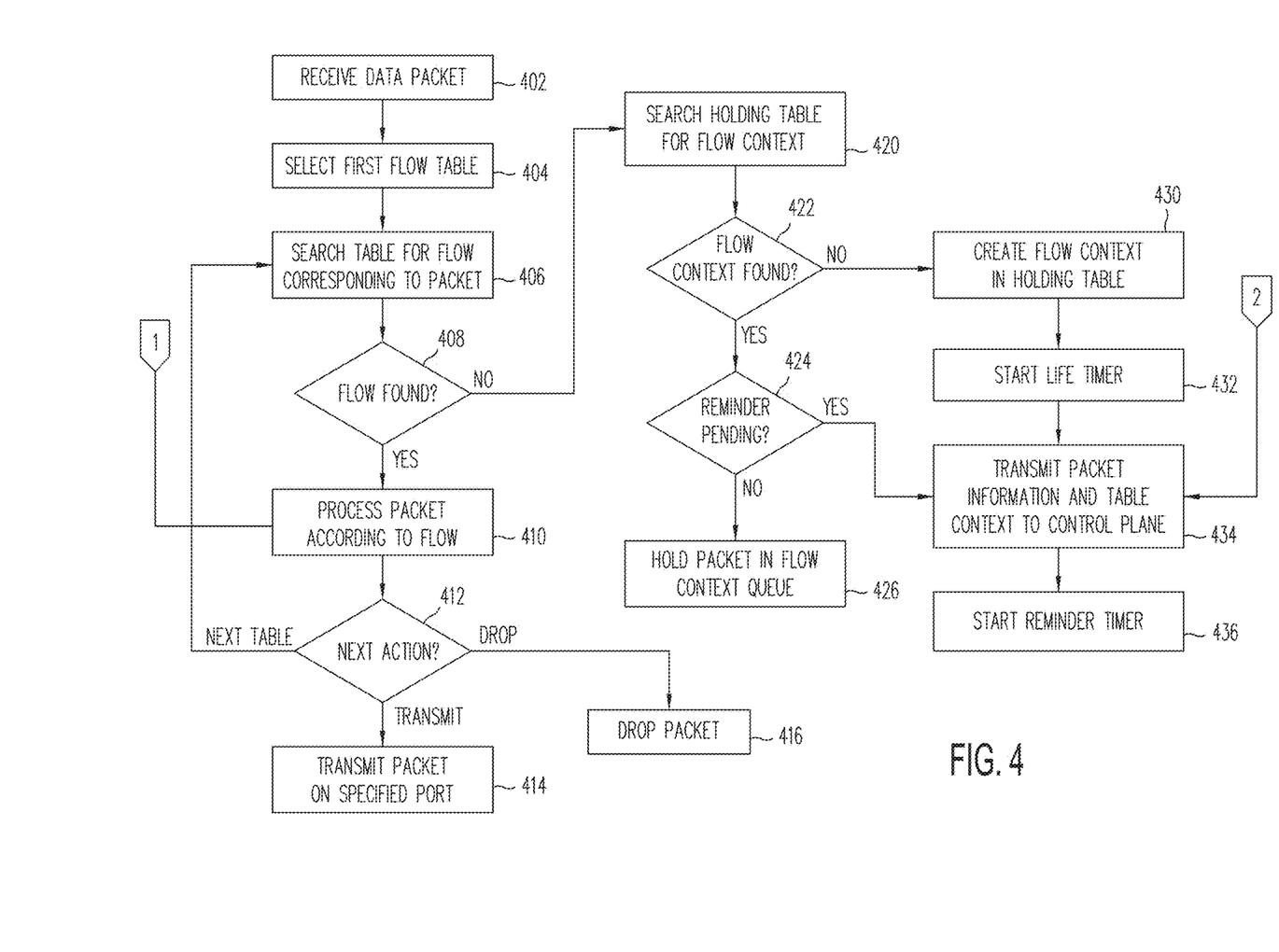
FIG. 4 is a simplified flow diagram illustrating data plane flow of a switch in accord with embodiments of the present invention.

FIG. 3 is a simplified flow diagram illustrating a data plane/control plane system 300, in accord with embodiments of the present invention. FIG. 4 is a simplified flow diagram illustrating data plane flow of a switch in accord with embodiments of the present invention.

A switch 302 is coupled to data network 104. Switch 302 locally contains a data plane 306 for processing data packets arriving from data network 104. Data packets are received at data ports 308 (402). The data packets are provided from the data ports to a pre-processor 310. Pre-processor 310 performs preliminary tasks on the information found in a data packet, including, for example, flow lookup.

Pre-processor 310 can examine the data packet and extract information that serves to identify the associated flow (e.g., destination, data type, and the like). The pre-processor can then use that information to perform a lookup on flow tables 314 stored in flow table memory 312. Flow table memory can be a ternary content-addressable memory (TCAM). A first flow table is selected (404) and the table is searched for flow entries corresponding to the information contained in the packet (406).

If pre-processor 310 determines that the data packet has a corresponding flow table entry associated with the information in the packet (410), then the data packet can be provided to flow processor 324 for processing through the flow table entries. A determination is made whether there is a next action associated with the flow (412). Such actions can include dropping the packet (416), transmitting the packet on a specified port (414), or continuing processing of the data packet in accord with an entry in a next table, as defined in the current flow table entry (406). A typical flow for a data packet can be defined by one or more flow tables 314 stored in flow table memory 312. Flow processor 324 can be one processor or multiple processors configured as a pipeline, which can access the various flow tables as needed. Data packet header information can be modified by flow processor 324 during the processing. Once flow processing is completed, the modified data packet can be provided to post-processor 326 for preparation to transmit via data ports 308.

It should be noted that multiple processors (e.g., multiple processor cores or multiple single core processors) can be associated with the various functionality discussed above. For example, processors can operate in a pipeline, such as one for each table, as discussed above. Alternatively, two processors can process different packets matching different flows in a same table. But, in order to maintain proper state and to maintain packet flow ordering, multiple processors, each processing a different packet, cannot work on a same flow in a same table at the same time.

Should pre-processor 310 not find an associated flow in flow tables 314 for the received packet (408), then the packet is sent to holding table processor 316. Holding table processor 316 can search a holding table 318 for a flow context matching that of the data packet (420). If no matching flow context is found (422), then the holding table processor stores a flow context associated with the data packet in holding table 318 (430). Holding table 318 can be stored in flow table memory 312 or a separate memory. Holding table processor 316 then starts a life timer (432), storing the timer information in a timer table 322 in timer table memory 320. The life timer is associated with the holding table flow context. If the life timer expires before a response is received from the controller (e.g., 510), then the holding table flow context will be deleted by the holding table processor, as will the queued packets. Holding table processor 316 can then transmit the data packet through port 323 to controller 130 via control network 118 (434). A shorter reminder timer can also be started by the holding table processor (436). If the reminder timer expires before a control plane offload, then the next queued packet, if any, can be sent to the control plane until a response is received by the control plane, or the lifetime timer triggers. These subsequent packets are sent to compensate for possible packet loss in control network 118.

If a matching flow context for the data packet is found by the holding table processor (408), then timer table 322 is checked to determine whether the reminder timer is still pending (424). The reminder timer is consider to be bending if the reminder timer has triggered but there were no packets queued to send to the controller. But now that a packet has arrived, the packet can be sent. If the reminder timer is not pending, then the packet is held in the associated flow context queue of the holding table (426). If the reminder timer is pending (424), then the packet can be transmitted to the controller, along with table context (434). Embodiments are configured to not retransmit packets from the data plane to the control plane.

Figure 5:
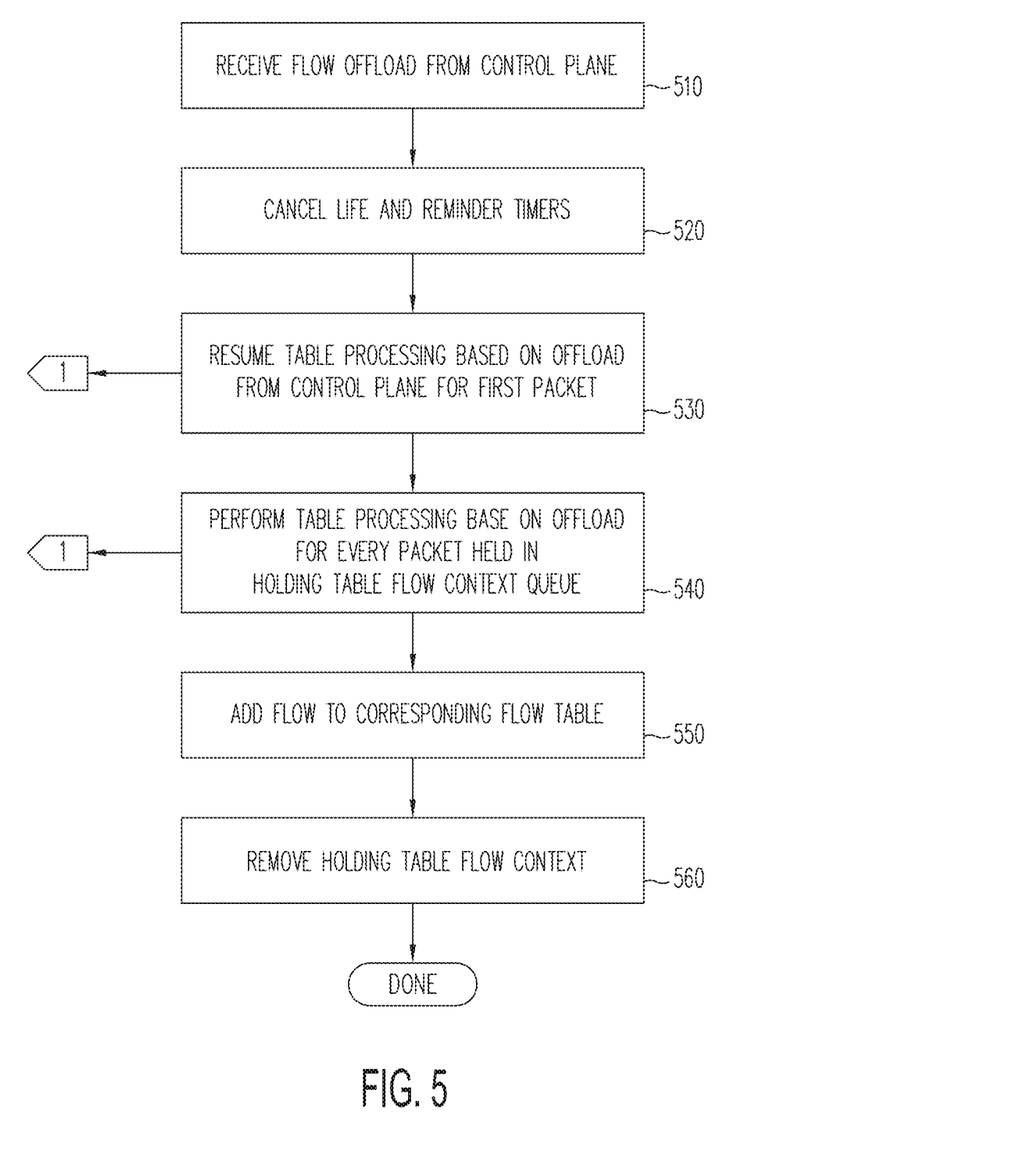
FIG. 5 is a simplified flow diagram illustrating a continuation of FIG. 4 for the received offload from the control plane, in accord with embodiments of the present invention.

The actions taken at the control plane are the same as those discussed above with regard to FIG. 1. FIG. 5 is a simplified flow diagram illustrating a continuation of FIG. 4 for the received offload from the control plane, in accord with embodiments of the present invention. Once the control plane determines the appropriate flow for the data packet, the data plane at the switch can receive the flow offload from the controller at port 350 (510). The command processor can then cancel the life and reminder timers associated with the data flow (520). Now that the flow offload has been received, table processing can be resumed for the first packet that had been sent to the controller (530). Flow for the first packet can proceed to numeral "1" in FIG. 4, where the first packet is processed according to the flow (410). Command processor 352 can perform table processing based on the flow offload for all packets queued in the holding table flow context (540). The flow for those packets then proceeds to numeral "1" in FIG. 4, where the packet is processed according to the offloaded and stored flow (410). Command processor 352 processes the commands associated with the flow offload and stores them in the appropriate flow tables 314, identifying the flow context using a context identifier returned by the controller (550). The command processor can then remove the holding table flow context (560).

Figure 6:
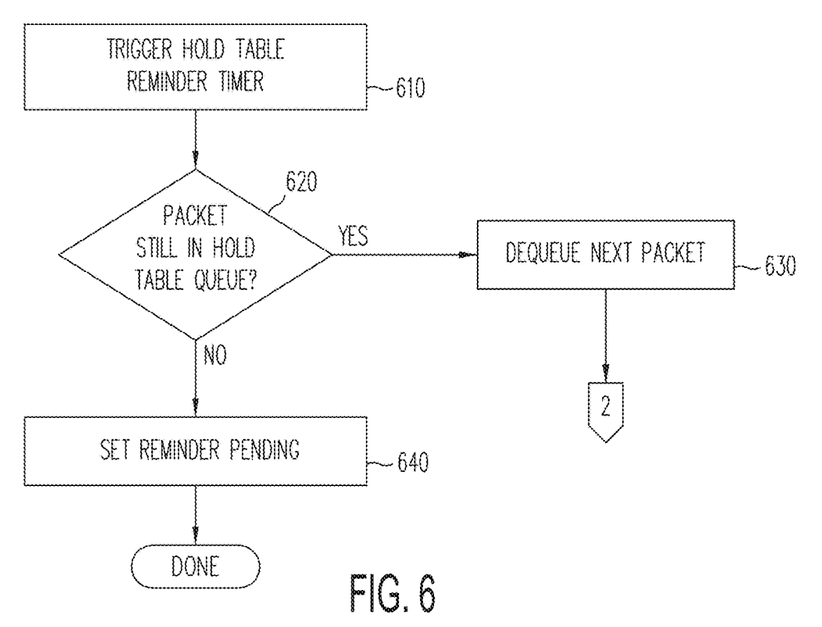
FIG. 6 is a simplified flow diagram illustrating a continuation of FIG. 4 for the event of a hold table reminder timer trigger, in accord with embodiments of the present invention.

FIG. 6 is a simplified flow diagram illustrating a continuation of FIG. 4 for the event of a hold table reminder timer trigger, in accord with embodiments of the present invention. When the holding table reminder time triggers (610), a determination can be made as to whether a packet is still in the holding table queue (620). If a packet is still in the holding table queue, then the next packet is dequeued (630) and the process continues at numeral "2" in FIG. 4, with transmitting packet information regarding the dequeued packet, and table context, to the control plane. If there are no packets in the hold table queue (620), then a reminder timer flag is set (640) so that another packet arriving on the flow before offload can be immediately sent to the control plane.

Figure 7:
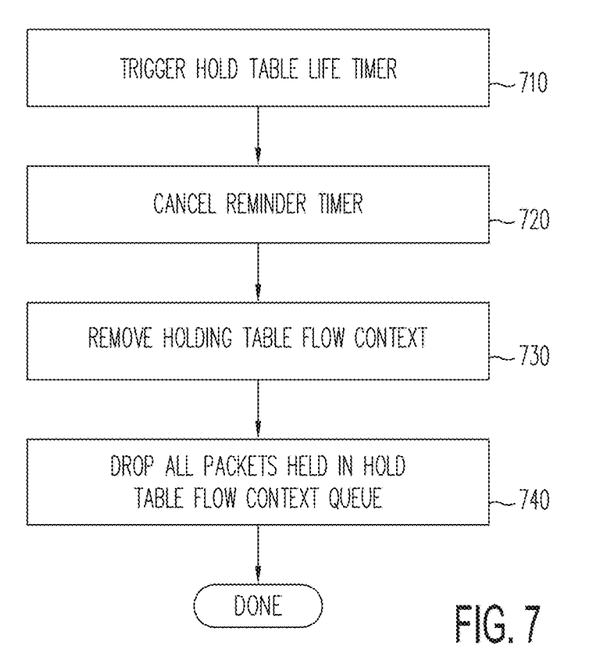
FIG. 7 is a simplified flow diagram illustrating the steps involved in the expiration of a life timer, in accord with embodiments of the present invention.

FIG. 7 is a simplified flow diagram illustrating the steps involved in the expiration of a life timer, in accord with embodiments of the present invention. The holding table life timer is triggered (710), and, in response, the reminder timer is canceled (720). Further, in response to the holding table life timer trigger, the holding table flow context 318 is removed from flow table memory 312 (730) and all packets being held in the holding table flow context queue are dropped (740).

By incorporating embodiments of the present invention in network devices such as switches and routers, data plane-to-control plane communications can be reduced, thereby decreasing network bandwidth on a communication channel between the network device and a controller embodying the control plane. In addition, control plane processing resources can be conserved by not needing to perform operations on multiple packets belonging to a data stream.

By now it should be appreciated that there has been provided a system for transmitting a data packet in a network. The system includes a network controller configured to provide data flow information to one or more network devices and a network device coupled to the network controller. The network device further includes: a data port, coupled to a data network, and configured to receive a data packet that includes information identifying a data flow associated with the data packet; a flow table memory storing one or more flow tables and one or more holding tables; a first processor, coupled to the data port, and configured to determine whether the information identifying the data flow associated with the data packet matches an entry in a flow table stored in the flow table memory, and provide the data packet to a second processor if the information identifying the data flow associated with the data packet fails to match any entry in any flow table stored in the flow table memory; and, the second processor configured to determine whether the information identifying the data flow associated with the data packet matches an entry in the holding table stored in the flow table memory, and transmit the data packet to the network controller if the information identifying flow associated with the data packet fails to match any entry in the holding table wherein the holding table includes identifying information associated with data previously transmitted to the network controllers.

In one aspect of the above embodiment, the second processor is further configured to store a flow context in the holding table where the matching flow context matches the information identifying the data flow associated with the data packet, if the information identifying the data flow associated with the data packet fails to match any entry in the holding table, and store the data packet in association with a flow context matching the information identifying the data flow associated with the data packet. In a further aspect, the second processor is further configured to start a life timer associated with the data flow associated with the data packet in response to storing the matching flow context in the holding table, and store life timer information in a timer table memory coupled to the second processor. In still a further aspect, the second processor is further configured to delete the matching flow context from the holding table, if the life timer associated with the data flow associated with the data packet expires prior to receiving, from the network controller, a response associated with the data flow.

In another aspect of the above embodiment, the second processor is further configured to start a reminder timer associated with the data flow associated with the data packet in response to transmitting the data packet to the network controller, and transmit a second data packet associated with the data flow associated with the data packet in response to the reminder timer expiring prior to receiving, from the controller, a response associated with the data flow.

In another aspect of the above embodiment, the data port of the network device is configured to receive a second data packet including information identifying the data flow associated with the data packet, and the second processor is further configured to determine whether the information identifying the data flow associated with the second data packet matches an entry in the holding table stored in the flow table memory, and store the second data packet in a flow context queue associated with the matching entry in the holding table where the flow context queue is stored in the flow table memory. In a further aspect, the second processor is further configured to check if a reminder timer associated with the data flow associated with the second data packet in response to transmitting the data packet to the network controller has expired, and transmit the second data packet to the network controller in response to the reminder timer expiring.

In another aspect of the above embodiment, the network device further includes a second data port, coupled to a control network, and configured to transmit the data packet to the network controller over the control network. In a further aspect, the network device further includes a third data port, coupled to the control network, and configured to receive a flow offload from the network controller, and a third processor coupled to the third data port and the flow table memory and configured to add a flow entry to a corresponding flow table where the flow entry includes information within the flow offload, and remove the matching flow context associated with the flow offload from the holding table. In still a further aspect, the network device is further configured to process the data packet using the flow entry, and process any additional data packets associated with the data flow associated with the data packet using the flow entry where the additional data packets were stored in a flow context queue associated with the data flow associated with the data packet.

Another embodiment of the present invention provides a method for determining a flow for a data packet of a stream of packets received at a network device. The method includes comparing information identifying a data flow associated with the data packet with entries stored in one or more flow tables stored in a flow table memory of a data switch. If there are no matching entries stored in the flow tables, then the method further includes comparing the information identifying the data flow associated with the data packet with entries stored in a holding table stored in the flow table memory, and transmitting the data packet from the network device to a network controller if the information identifying the data flow associated with the data packet fails to match any entry in the holding table. The holding table includes identifying information for data flows associated with previously received data packets that have already been transmitted to the network controller.

In a further aspect of the above embodiment, the method further includes storing a matching flow context entry in the holding table and storing the data packet in association with a flow context matching the information identifying the data flow associated with the data packet. The matching flow context entry includes information matching the information identifying the data flow associated with the data packet if the information identifying the data flow associated with the data packet fails to match any entry in the holding table. In still a further aspect, the method further includes starting a life timer associated with the data flow associated with the data packet in response to storing the matching flow context in the holding table, and storing information associated with the life timer in a timer table memory. In yet a further aspect, the method includes deleting the matching flow context entry from the holding table if the life timer associated with the data flow associated with the data packet expires prior to receiving, at the network device from the network controller, a response associated with the data flow. In another further aspect, the method includes starting a reminder timer associated with the data flow associated with the data packet in response to transmitting the data packet to the network controller, and transmitting a second data packet associated with the data flow associated with the data packet in response to the reminder timer expiring prior to receiving, at the network device from the network controller, a response associated with the data flow. A time associated with the reminder timer is less than a time associated with the life timer.

In another aspect, the method further includes determining whether information identifying a data flow associated with a second data packet matches an entry in the holding table stored in the flow table memory, and storing the second data packet in a flow context queue associated with the matching entry in the holding table. The flow context queue is stored in the flow table memory. In a further aspect, the method further includes checking if a reminder timer associated with the data flow associated with the second data packet in response to transmitting a previous data packet to the network controller has expired, and transmitting the second data packet to the network controller in response to the reminder timer having expired.

In another aspect of the above embodiment, the method further includes receiving a flow offload from the network controller where the flow offload corresponds to the data flow associated with the data packet, adding a flow table entry to a corresponding flow table where the flow table entry includes information within the flow offload, and removing the matching flow context associated with the flow offload from the holding table. In a still further aspect, the method further includes processing the data packet using the flow table entry, and processing any additional data packets associated with the data flow associated with the data packet using the flow entry. The additional data packets were stored in a flow context queue associated with the data flow associated with the data packet.

Another embodiment of the present invention is a network switch that includes: a flow table memory storing one or more flow tables and one or more holding tables, and a processor coupled to the flow table memory. A holding table includes identifying information for data flows associated with data packets previously received at the network switch and that have already been transmitted to a network controller but for which no response has been received from the network controller at the network switch. The processor is configured to: transmit, to the network controller, a data packet including flow information associated with the packet having no matching entry in the holding table and flow tables; and, store, in the flow table memory, a data packet including flow information associated with the packet having a matching entry in the holding table and no matching entry in the flow tables.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of a system, for example, from computer readable media such as memory 35 or other media on other computer systems. Such computer readable media may be permanently, removably or remotely coupled to a network device such as switch 302. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system for transmitting a data packet in a data network, the system comprising:
   a network controller configured to provide data flow information to one or more network devices; and
   a network device, coupled to the network controller, wherein the network device further comprises
     a data port, coupled to a data network, and configured to receive a data packet comprising information identifying a data flow associated with the data packet,
     a flow table memory storing one or more flow tables and one or more holding tables,
     a first processor, coupled to the data port, and configured to
       determine whether the information identifying the data flow associated with the data packet matches an entry in a flow table stored in the flow table memory,
       provide the data packet to a second processor if the information identifying the data flow associated with the data packet fails to match any entry in any flow table stored in the flow table memory, and
     the second processor configured to
       determine whether the information identifying the data flow associated with the data packet matches an entry in a holding table stored in the flow table memory,
       transmit the data packet to the network controller, if the information identifying the data flow associated with the data packet fails to match any entry in the holding table, wherein the holding table comprises identifying information associated with data packets previously transmitted to the network controllers, and
       store the data packet in a flow context queue associated with the matching entry in the holding table, if the information identifying the data flow associated with the data packet matches an entry in the holding table, wherein
         the flow context queue is stored in the flow table memory, and
         the flow context queue comprises data packets awaiting processing instructions for a flow corresponding to each data packet.

2. The system of claim 1 wherein the second processor is further configured to:
   store a matching flow context in the holding table wherein the matching flow context matches the information identifying the data flow associated with the data packet, if the information identifying the data flow associated with the data packet fails to match any entry in the holding table; and store the data packet in association with a flow context matching the information identifying the data flow associated with the data packet.

3. The system of claim 2 wherein the second processor is further configured to:

start a life timer associated with the data flow associated with the data packet in response to storing the matching flow context in the holding table; and store life timer information in a timer information table memory coupled to the second processor.

4. The system of claim 3 wherein the second processor is further configured to:

delete the matching flow context from the holding table, if the life timer associated with the data flow associated with the data packet expires prior to receiving, from the network controller, a response associated with the data flow.

5. The system of claim 2 wherein the second processor is further configured to:

start a reminder timer associated with the data flow associated with the data packet in response to transmitting the data packet to the network controller; and transmit a second data packet associated with the data flow associated with the data packet in response to the reminder timer expiring prior to receiving, from the controller, a response associated with the data flow.

6. The system of claim 2, wherein the data port of the network device is configured to receive a second data packet comprising information identifying the data flow associated with the data packet; and the second processor is further configured to determine whether the information identifying the data flow associated with the second data packet matches an entry in the holding table stored in the flow table memory, and store the second data packet in a flow context queue associated with the matching entry in the holding table, wherein the flow context queue is stored in the flow table memory.

7. The system of claim 6 wherein the second processor is further configured to:

check if a reminder timer associated with the data flow associated with the second data packet in response to transmitting the data packet to the network controller has expired; and transmit the second data packet to the network controller in response to the reminder timer expiring.

8. The system of claim 2 wherein the network device further comprises:

a second data port, communicatively coupled to a control network, and configured to transmit the data packet to the network controller over the control network.

9. The system of claim 8 wherein the network device further comprises:

a third data port, coupled to the control network, and configured to receive a flow offload from the network controller;

a third processor, coupled to the third data port and the flow table memory, and configured to add a flow entry to a corresponding flow table, wherein the flow entry includes information within the flow offload, and remove the matching flow context associated with the flow offload from the holding table.

10. The system of claim 9 wherein the network device is further configured to:

process the data packet using the flow entry; and process any additional data packets associated with the data flow associated with the data packet using the flow entry, wherein the additional data packets were stored in a flow context queue associated with the data flow associated with the data packet.

11. A method for determining a flow for a data packet of a stream of packets received at a network device, the method comprising:

comparing, by a first processor, information identifying a data flow associated with the data packet with entries stored in one or more flow tables stored in a flow table memory of a data switch; and if there are no matching entries stored in the one or more flow tables for the information identifying the data flow associated with the data packet, then comparing, by a second processor, the information identifying the data flow associated with the data packet with entries stored in a holding table stored in the flow table memory, transmitting, using a rate limiting interface, the data packet from the network device to a network controller, if the information identifying the data flow associated with the data packet fails to match any entry in the holding table, wherein the holding table comprises identifying information for data flows associated with previously received data packets that have already been transmitted to the network controller, and storing, by the second processor, the data packet in a flow context queue associated with the matching entry in the holding table, if the information identifying the data flow associated with the data packet matches an entry in the holding table, wherein the flow context queue is stored in the flow table memory, and the flow context queue comprises data packets awaiting processing instructions for a flow corresponding to each data packet.

12. The method of claim 11 further comprising:

storing a matching flow context entry in the holding table wherein the matching flow context entry comprises information matching the information identifying the data flow associated with the data packet, if the information identifying the data flow associated with the data packet fails to match any entry in the holding table; and storing the data packet in association with a flow context matching the information identifying the data flow associated with the data packet.

13. The method of claim 12 further comprising:

starting a life timer associated with the data flow associated with the data packet in response to storing the matching flow context in the holding table; and storing information associated with the life timer in a timer table memory.

14. The method of claim 13 further comprising:

deleting the matching flow context entry from the holding table if the life timer associated with the data flow associated with the data packet expires prior to receiving, at the network device from the network controller, a response associated with the data flow.

15. The method of claim 13 further comprising:

starting a reminder timer associated with the data flow associated with the data packet in response to transmitting the data packet to the network controller; and transmitting a second data packet associated with the data flow associated with the data packet in response to the reminder timer expiring prior to receiving, at the network device from the network controller, a response associated with the data flow, wherein a time associated with the reminder timer is less than a time associated with the life timer.

16. The method of claim 12 further comprising:

determining whether information identifying a data flow associated with a second data packet matches an entry in the holding table stored in the flow table memory; and storing the second data packet in a flow context queue associated with the matching entry in the holding table, wherein the flow context queue is stored in the flow table memory.

17. The method of claim 16 further comprising:

checking if a reminder timer associated with the data flow associated with the second data packet in response to transmitting a previous data packet to the network controller has expired; and transmitting the second data packet to the network controller in response to the reminder timer having expired.

18. The method of claim 12 further comprising:

receiving a flow offload from the network controller wherein the flow offload corresponds to the data flow associated with the data packet;

adding a flow table entry to a corresponding flow table wherein the flow table entry includes information comprised within the flow offload; and removing the matching flow context associated with the flow offload from the holding table.

19. The method of claim 18 further comprising:

processing the data packet using the flow table entry; and processing any additional data packets associated with the data flow associated with the data packet using the flow entry, wherein the additional data packets were stored in a flow context queue associated with the data flow associated with the data packet.

* * * * *